United States Patent [19]

Towle et al.

[11] Patent Number: 4,990,589
[45] Date of Patent: Feb. 5, 1991

[54] POLY(ARYLENE ETHER KETONES)

[75] Inventors: Ian D. H. Towle, Cirencester; Patrick J. Horner, Swindon, both of England

[73] Assignee: Raychem Limited, England

[21] Appl. No.: 266,416

[22] Filed: Nov. 3, 1988

[30] Foreign Application Priority Data

Nov. 4, 1987 [GB] United Kingdom ............... 8725886

[51] Int. Cl.$^5$ ................... C08C 2/00; C08G 8/02; C08G 14/00
[52] U.S. Cl. ............................... 528/125; 528/126; 528/128; 528/219
[58] Field of Search ............... 528/125, 126, 128, 219

[56] References Cited

U.S. PATENT DOCUMENTS

| | | | |
|---|---|---|---|
| 3,441,538 | 4/1969 | Marks | 528/86 |
| 3,442,857 | 5/1969 | Thornton | 528/86 |
| 3,730,946 | 5/1975 | Heath et al. | 528/185 |
| 3,764,583 | 10/1973 | Newton et al. | 528/174 |
| 3,928,295 | 12/1975 | Rose | 528/226 |
| 4,268,650 | 5/1981 | Rose | 525/534 |
| 4,419,486 | 12/1983 | Rose | 525/534 |
| 4,567,248 | 1/1986 | Blinne et al. | 528/211 |
| 4,703,102 | 10/1987 | Fukuoka et al. | 528/125 |
| 4,717,761 | 1/1988 | Staniland | 528/125 |
| 4,766,197 | 8/1988 | Clendinning et al. | 528/125 |
| 4,806,617 | 2/1989 | Percec | 528/86 |
| 4,820,794 | 4/1989 | Darnell | 528/271 |
| 4,870,153 | 9/1989 | Matzner | 528/125 |

FOREIGN PATENT DOCUMENTS

| | | |
|---|---|---|
| 0194062 | 9/1986 | European Pat. Off. . |
| 0225194 | 6/1987 | European Pat. Off. . |
| 0278720 | 8/1988 | European Pat. Off. . |
| 61-285221 | 12/1986 | Japan . |
| 62-11726 | 1/1987 | Japan . |
| 1019226 | 2/1966 | United Kingdom . |
| 1383393 | 2/1975 | United Kingdom . |
| 1390918 | 4/1975 | United Kingdom . |
| 1414423 | 11/1975 | United Kingdom . |
| 2099006 | 12/1982 | United Kingdom . |
| 2172294 | 9/1986 | United Kingdom . |

OTHER PUBLICATIONS

Matsumura & Inada (Teigin), Chem. Abs. 109:171130r (abstract of JP 88/75,032 (1988).
Perec & Nava (Case Western Reserve U.), J. Polym. Sci. A Polym. Chem. 26, 783 (1988).
Sek & Zak (Poland) Eur. Polym. J. 17, 1193 (1981).
Toshiba Corp., Chem. Abs. 103:124120d (abstract of JP 85/71636 (1985).
Toshiba Corp., Chem. Abs. 103:124121e (abstract of JP 85/71635 (1985).
Sweeney (du Pont) Chem. Abs. 103:23548 (abstract of EP 254,431 (1988).
Banihashemi & Marvel (U. Ariz), J. Polym. Sci. Polym. Chem. Ed 15, 2653 (1977).
Banihashemi & Marvel (U. Ariz), J. Polym. Sci. Polym. Chem. Ed. 15, 2667 (1977).
Blinne & Hub (BASF), WPI 85-147922/25 (abstract of DE 3,343,958 (1985).
Kricheldorf, Delius, & Toennes (U. Hamburg), Chem. Abs. 110:58195y (abstract of New Polym. Mater. 1, 127 (1988).
Lee & Marvel (U. Ariz), J. Polym. Sci. Polym. Chem. Ed. 21, 2189 (1986).
Lin & Marvel (U. Ariz), J. Polym. Sci. Polym. Chem. Ed. 17, 2337 (1979).
Matsuo & Murakami (Idemitsu Kosan), Chem. Abs. 104:207913m (abstract of JP 85/235,835 (1985).
Mohanty, Lin, Ward & McGrath (VPI), Chem. Abs. 105:98414x (abstract of SAMPE Symp. Exhib. 31 (Mater. Sci. Future) 945 (1986).
Mohanty & McGrath (VPI), Chem. Abs. 105:134449y (abstract of Polym. Sci. Technol. 31, 113 (1985)).
Samyn & Marvey (U. Ariz.), J. Polym. Sci. Polym. Chem. Ed. 13, 1095 (1975).
Sivaramakrishnan & Marvel (U. Ariz), J. Polym. Sci. Polym. Chem. Ed. 12, 651 (1974).
Yoneda & Fukawa (Asahi Chem.), Chem. Abs. 108:151883q (abstract of JP 87/253,619 (1987)).
Jin et al., Brit. Polym. J. 17, 4 (1985).
Litter & Marvel, J. Polym. Sci. Polym. Chem. Ed. 23, 2205 (1985).
Lee & Marvel, J. Polym. Sci. Polym. Chem. Ed. 22, 295 (1984).
Dahl et al., WO 86/02368 (1986).

*Primary Examiner*—John Kight, III
*Assistant Examiner*—P. Hampton-Hightower
*Attorney, Agent, or Firm*—Herbert G. Burkard; Yuan Chao

[57] ABSTRACT

Partially crystalline polyaryletherketones having improved glass transition temperature without unacceptably high melting temperature are produced by incorporating multi-ring aryl moieties (e.g. terphenyls of naphthyls) in the polymer backbone and mono-substituting those or other moieties in the backbone, or arranging the aryl multi-ring groups asymmetrically so as to kink the backbone.

25 Claims, No Drawings

POLY(ARYLENE ETHER KETONES)

This invention relates to arylene ether ketone polymers having repeat units of the general formula

wherein each —O— is ether oxygen and each Z independently is a group other than —O— and at least 25%, preferably at least 50%, of the Z groups are —CO— groups, and each Ar moiety independently is selected from substituted and unsubstituted phenylene and substituted and unsubstituted polynuclear aromatic moieties having no two adjacent methylene carbon atoms forming part of the polymer backbone chain.

Published European Patent Application No. 0124276 describes a commercially preferred Friedel-Crafts polymerisation for making arylene ether ketone polymers of this kind, and it is known that the crystalline ether ketone polymers are valuable engineering polymers. Processing of such polymers can, however, be difficult, owing to their very high crystalline melting temperatures, for example 380°–400° C.

The present invention provides novel polymers of substantially unimparied engineering qualities having greatly improved processability. The term "polymers" is used herein to indicate both homopolymers and copolymers unless specifically otherwise stated.

The invention accordingly provides a crystalline thermoplastic (arylene ether ketone) polymer having repeat units of the general formula

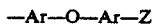 (I)

wherein
(a) each —O— is ether oxygen and each Z independently is a group other than —O— and at least 25% of the Z groups are —CO— groups,
(b) each Ar moiety independently is selected from substituted and unsubstituted phenylene and substituted and unsubstituted polynuclear aromatic moieties having no two adjacent methylene carbon atoms forming part of the polymer backbone chains,
(c) at least some of the non-terminal Ar moieties (i.e. Ar moieties which are not at the ends of the polymer backbone chain) comprise aryl-aryl moieties in which two or more aryl rings forming part of the polymer backbone chain are fused and/or directly single-bonded together, and/or twice bonded together to form a cyclic linking structure with more than 4 atoms in the cyclic linking structure (preferably at least one of the two bonds is indirect by way of a linking group),
(d) at least some of the Ar moieties independently are mono-substituted with substantially inert pendant substituent groups other than iodo, the substituent groups comprising not more than two aryl rings, if any, and/or at least some of the fused-ring aryl-aryl moieties project from, or form a kink in, the polymer backbone chain by virtue of each such aryl-aryl moiety being asymmetrical about a straight line passing through those two of its atoms whereby it is bonded to the remainder of the backbone chain, and
(e) the size, number and position of the substituent groups and/or the asymmetry of the asymmetrical aryl-aryl moieties are limited to retain at least 2% crystallinity in the bulk polymer after annealing between its glass transition temperature and its crystalline melting temperature.

Preferably the aforesaid —O— is attached directly to aromatic carbon atoms in the adjacent Ar moieties and is thus an aromatic ether oxgyen.

The term polynuclear aromatic moieties is used to mean aromatic moieties containing at least two aromatic rings. The rings can be fused, joined by a direct bond or by a linking group. In certain cases at least two of the aromatic rings are linked by an ether oxygen linkage. Other linking groups which can join aromatic rings in the aromatic moieties include for example, carbonyl, sulfone, sulfide, ester, amide, imide, azo, methylene, isopropylidine, hexafluoroisopropylidene and the like.

While it is difficult to predict theoretically precise numerical limits either for the size and number of the substituent groups, or for the desirable degree of projection or chain kinking of the aryl-aryl groups, it is simple in practice to select suitable aryl-aryl groups and/or suitable numbers of suitable substituent groups by preparing and annealing the desired polymer and checking that its crystallinity equals or exceeds the required minimum by standard X-ray diffraction techniques, for example as described in "Experimental Methods in Polymer Chemistry", pages 507–510 and references therein, by Jan F Rabek, Published by John Wiley & Sons, 1983. Without reaching the levels at which the crystallinity drops below 2%, the number, size and position of the substituents and/or the asymmetry of the asymmetrical arylaryl moieties will preferably be selected so as to reduce significantly the crystalline melting temperature (Tm) of the polymer, for example reducing Tm by at least 5° C., preferably by at least 10° C., relative to the corresponding polymer with no (or at least less) substitution and/or aryl-aryl asymmetry.

Generally speaking, an average of 0.1 substituent groups per repeat unit will often be appropriate, but the number may for example range from 0.1 to 5 or 10 In other words, the number of substituent groups will preferably be from 0.02 to 2% of the molecular weight, for example 0.02 to 1.5% or 1%, or perhaps 0.05 or 0.1 to 1%, especially 0.2 or 0.5 to 1%. The upper limit for any given polymer is that proportion of substituent groups at which the degree of crystallinity drops to 2%. It may be noted that the crystallinity does not necessarily decrease at low levels of substitution which are nevertheless sufficient to depress Tm, but may decrease relatively suddenly as higher percentages of substituent groups are approached.

It will be understood that the "substantially inert" substituent groups are pendant groups which take no significant part in the polymerisation reaction itself and which do not subsequently cause any unacceptable instability or reaction in the resulting polymer, thus excluding, for example, alkynyl and carboxyl groups. Iodo groups, being the least stable of the halo- substituents for the Ar moieties, are also excluded.

The size of the substituent groups may, for example, be within the range from fluoro to diphenylcarbonyl. Lower alkyl groups, especially methyl groups, are preferred as relatively inert substituents, but other groups may be selected to suit the desired qualities in the polymer, provided they do not interfere unacceptably with the polymerisation reaction. For example, the substituent groups may be selected from $C_1$-$C_6$ alkyl and cycloalkyl groups; haloalkyl groups, e.g. CF$_3$; deactivated aryl groups, for example benzoyl, phenylsulphonyl, nitrophenyl, acetylphenyl: fluoro, chloro and nitro, groups; and other substantially non-acidic groups.

Preferably the substitution and/or aryl-aryl asymmetry will be such that the polymer retains at least 5%, more preferably at least 10, even more preferably at least 20%, and especially 25–35%, crystallinity after the annealing. Crystallinity as high as 40% or 45% may be useful, where achievable.

Particularly valuable polymers are those in which at least 70%, preferably at least 80%, more preferably at least 90%, and especially substantially all, of the Z groups are —CO— groups. Commercially useful polymers may nevertheless result when some of the Z groups independently are selected from, for example, imide, amide, ester, azo, quinoxaline, benzimidazole, benzoxazole, benzothiazole, sulphone, sulphide, and methylene groups.

The substituent groups may be provided either by direct substitution of the Ar groups in the polymer backbone chain after its formation, or by inclusion in one or more monomers from which the polymer is formed. Any one aryl moiety may contain either one or more substituent groups, or the said aryl-aryl moieties, or both, but it is preferred that substantially all the substituted Ar moieties be mono-substituted. Potentially suitable monomers, which may have activated hydrogens or acid chloride groups at both ends (in which case one monomer ending with hydrogens and one with acid chlorides will be selected), or may wave activated hydrogen at one end and acid chloride at the other (in which case the monomer will react with itself), include for example

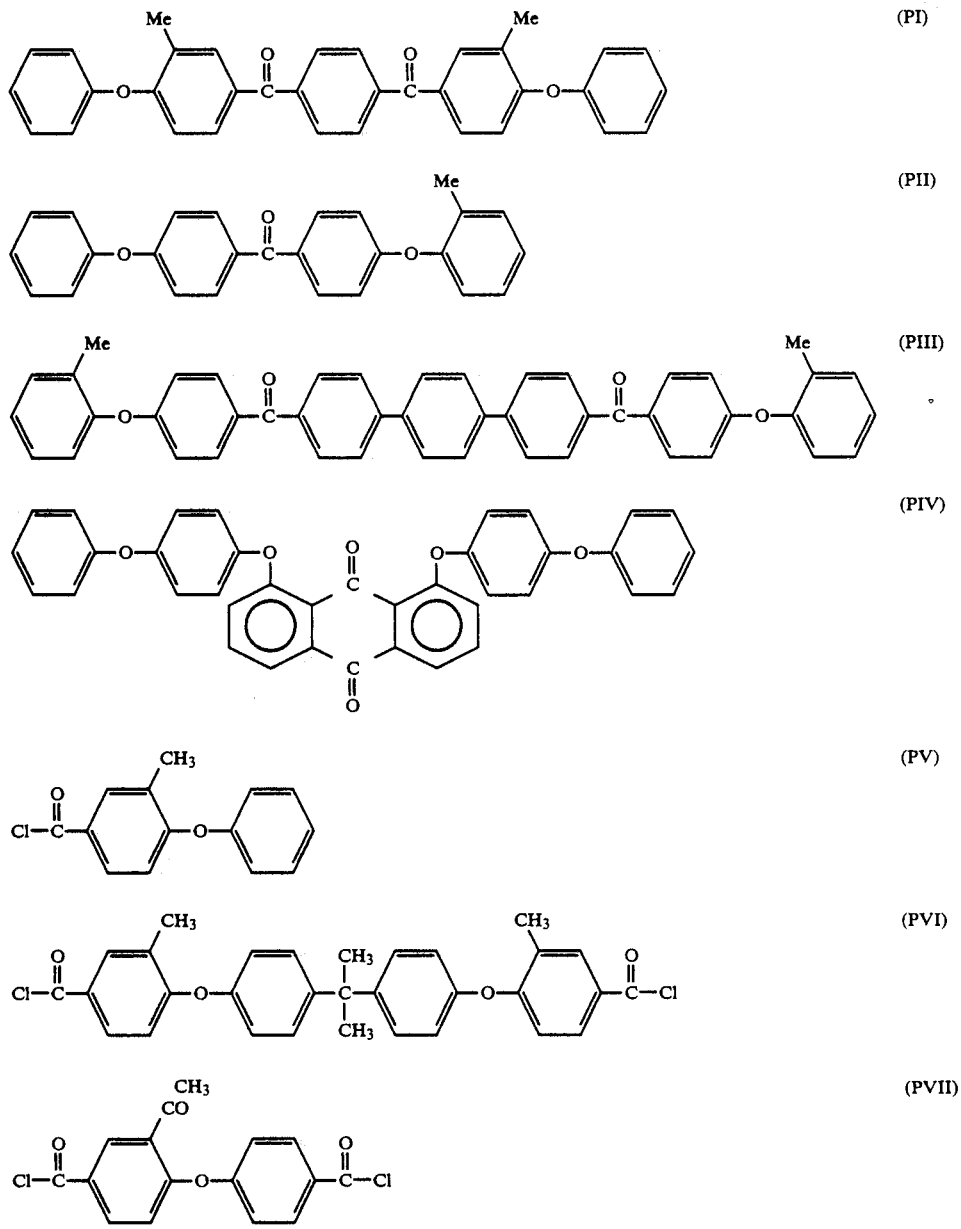

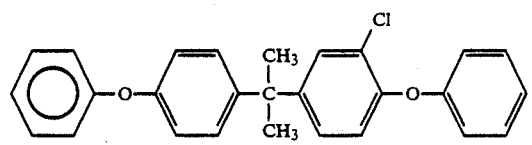
(PVIII)
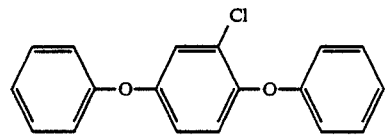
(PIX)
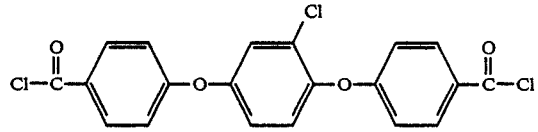
(PX)
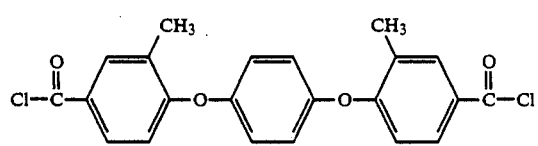
(PXI)
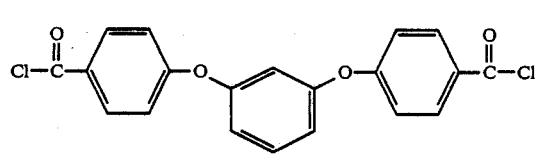
(PXII)
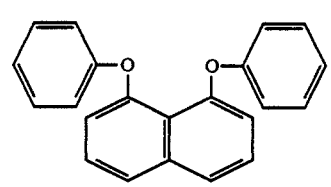
(PXIII)
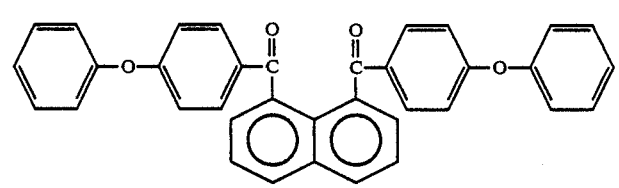
(PXIV)
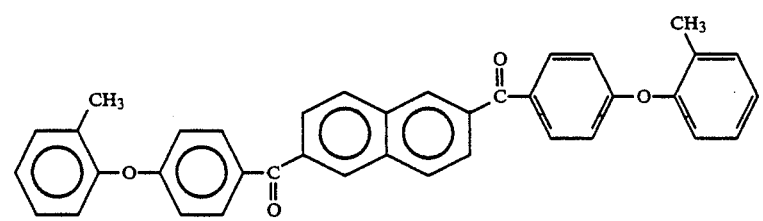
(PXV)
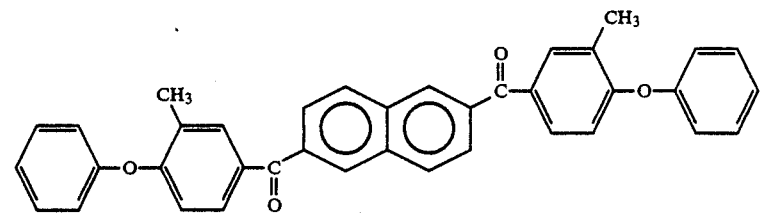
(PXVI)

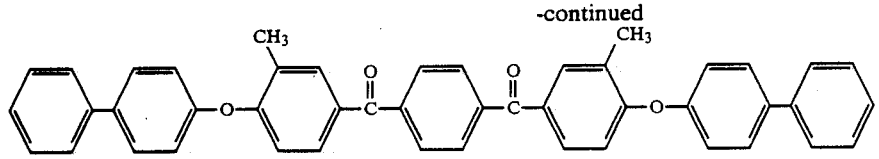

(PXVII)

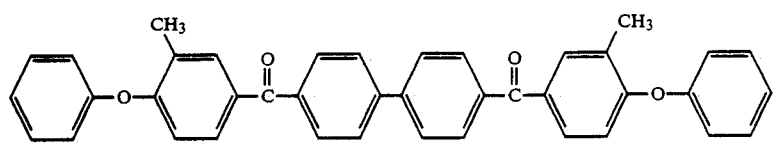

(PXVIII)

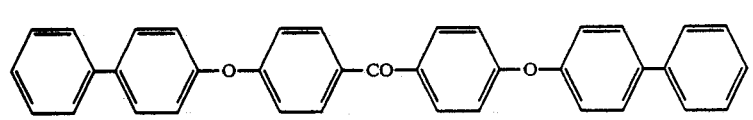

(PXIX)

The phenylene moieties present are preferably p-phenylene moieties as shown, but m-phenylene moieties may be useful or advantages for some purposes. Acid halide monomers other than acid chlorides, e.g. acid fluorides, may also be used.

Monomers PIV, PXIII, and PXIV contain examples of aryl-aryl moieties which may sufficiently kink or project from the polymer backbone chain to lower the crystalline melting temperature without (or with less) need for the specified substitution. In these three examples, the desired lowering of Tm may be achieved by virtue of each of the aryl-aryl moieties being sufficiently asymmetrical about a straight line passing through those two of its atoms whereby it is bonded to the remainder of the polymer backbone chain. Thus, for example, an asymmetrical 1,4- or 1,8-naphthyl moiety may lower Tm sufficiently without further substitution, whereas a symmetrical (about the said line) 1,5- or 2,6-naphthyl moiety would not. An intermediate effect could result from the less asymmetrical 1,6-naphthyl moiety, which would project less than the 1,8-naphthyl moiety Similarly, simple experimentation would show to what extent the asymmetrical projection and/or degree of kinking of the 1,7- or 2,7- naphthyl moieties would reduce the need for substitution.

Looked at another way, it may be preferable to select aryl-aryl moieties such that either the straight line passing through the two polymer chain atoms directly bonded to the aryl-aryl moiety does not traverse the aryl-aryl moiety (e.g. 1,8-naphthyl), or the length of that portion of the said line which traverses the aryl-aryl moiety is not greater than the maximum diameter of a benzene ring, examples including 1,4- or 1,5-naphthyl or 1,5-anthracyl, but not 2,6- or 2,7- naphthyl or 1,6- or 2,6- anthracyl. It can be seen that 1,4-naphthyl or 1,4-anthracyl moieties, for example, could disrupt the crystal packing by virtue of their greater asymmetry about the line between their atoms of attachment.

The presence of the substituent groups, especially lower alkyl groups, and/or the asymmetrical aryl-aryl moieties tends to reduce the crystalline melting point (Tm), often by as much as 40° C., without unacceptably affecting the glass transition temperature (Tg), and while substantially retaining the advantages of crystallinity in the polymer. Tm and Tg can be determined by known methods, for example Differential Scanning Calorimetry (DSC) and Dynamic Mechanical Thermal Analysis (DMTA).

Unsubstituted monomers which may potentially be used together with the monomers listed above include those described in the aforementioned European Published Patent Application No. 0124276, the disclosure of which is incorporated herein by reference.

In some of the new class of polymers prepared according to the invention, Tg is significantly raised to the general benefit of the engineering properties of the polymer, while achieving a commercially acceptable crystalline melting point and improvement in processability. This benefit is thought possibly to arise from the aryl-aryl moieties generally increasing the rigidity of the polymer backbone chain, thereby raising Tg and Tm, while the substituent groups and/or asymmetrical aryl-aryl moieties disrupt the chain packing in the bulk polymer sufficiently to reduce the crystalline bonding energy (though not necessarily reducing the observed % crystallinity), thus reducing the crystalline melting point. It will be understood, however, that the invention is not to be limited in terms of this hypothetical explanation.

The aryl-aryl moieties are preferably thermally stable at least up to 300° C., more preferably up to at least 325° or 350° C., and especially up to 375° or 400° C., and may for example be selected from biphenyl or terphenyl moieties, or from naphthalene or other fused-ring moieties, and it may be advantageous to select aryl-aryl moieties other than biphenyl or naphthyl moieties Terphenyl moieties are especially preferred.

Those Ar moieties which comprise the aryl-aryl moieties may include linking moieties which link the two respective rings of the aryl-aryl moieties with the remainder of the polymer backbone chain, or the aryl-aryl moieties may be directly bonded to the —O— and —Z— groups in the polymer backbone chain. Examples of such linking moieties include phenyloxy, phenyloxybenzoyl, phenyloxyphenoxy, imide, amide, ester, azo, quinoxaline, benzimidazole, benzoxazole, benzothiazole, carbonyl, sulphone, sulphide and methylene groups.

Examples of aryl-aryl moieties include suitably bonded (into the polymer chain) aromatic structures corresponding to biphenyl, terphenyl, polyphenyl, naphthalene, anthracene, xanthene, and 0 and/or N heterocyclic analogues thereof, e.g. dibenzofuran.

The preferred method of synthesising the polymers according to this invention is the Friedel-Crafts polymerisation described in the aforementioned Published European Patent Application, the disclosure of which is incorporated herein by reference, but other known methods may also be used if desired, bearing in mind that the products of such other processes may be less satisfactory, e.g. in terms of thermal stability or molecular weight. An inherent viscosity of at least 0 6, preferably at least 0.8, more preferably at least 1.0 is preferred, measured as described in the said European application.

Some specific examples of the present invention will now be described.

EXAMPLE 1

A polymer of I.V. 2.03 dl/g having Tg at 179° C. and Tm 365° C. was prepared using the following reagents:

| | | |
|---|---|---|
| 4,4'-Diphenoxybenzophenone | 1.0598 g | $2.8923 \times 10^{-3}$ M |
| 1,4'-Bis(4-phenoxy-3-methylbenzoyl)benzene* | 1.4421 g | $2.8924 \times 10^{-3}$ M |
| 4,4'-Bis(4-phenylphenyloxy)benzophenone* | 1.5000 g | $2.8923 \times 10^{-3}$ M |
| Terephthaloyl Chloride | 1.7300 g | $8.523 \times 10^{-3}$ M |
| Dimethyl sulphone | 1.600 g | 0.017 M |
| Aluminium Trichloride | 7.34 g | 0.055 M |
| Dichloromethane | 30 mls | |

(*Monomers PI and PXIX)

To a 100 ml resin kettle equipped with a stirrer and nitrogen inlet, having been purged with nitrogen, was added 20 mls of dichloromethane which was cooled to −30° C. To the cold dichloromethane was added the anhydrous aluminium trichloride After allowing the temperature of the slurry to fall to −25° C., the dimethyl sulphone was added at a rate such that the temperature in the resin kettle did not rise above −15° C. After cooling to −30° C., the 4,4'-diphenoxybenzophenone, 1,4-bis(4-phenoxy-3-methylbenzoyl)-benzene, and 4,4'-bis(4-phenylphenyloxy)benzophenone were added and washed into the flask with 5 mls of fresh dichloromethane. Again after cooling to −20° C. 5 g, the terephthaloyl chloride was added and washed in with 5 mls of fresh dichloromethane. Whilst stirring, the temperature in the resin kettle was slowly allowed to rise over a period of 1½ hours to 20° C. which was then maintained for 6 hours. The orange/yellow polymer gel was decomplexed from the aluminium chloride by chopping into small pieces and adding these to cold (−10° C.) 4N HCl in a high speed blender. After blending the polymer was filtered off as a white fibrous solid. The solid was transferred to a 1 liter reaction flask containing 0.75 liters of deionized water and stirred for 24 hours. After this time the mixture was brought to reflux and residual, volatile organics removed The polymer was then filtered and slurried in 0.75 liters of fresh deionized water and heated to 95° C. for 3 hours. This was repeated once more using aqueous ammonia (pH 10) and finally in deionized water. After filtration and rinsing with 4×200 mls of warm deionized water the polymer was dried at 190° C. overnight. The repeat units of this copolymer are (Ph=p-phenylene)

—Ph—O—Ph—CO—Ph—O—Ph—CO—

Ph—CO—,

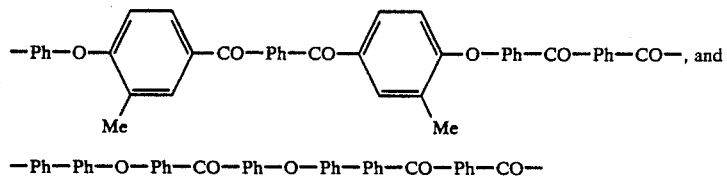

—Ph—Ph—O—Ph—CO—Ph—O—Ph—Ph—CO—Ph—CO—

EXAMPLE 2

Following the procedure outlined in Example 1 a polymer of I.V. 0.80 dl/g having Tg at 180° C. and Tm 320° C. was prepared using the following reagents.

| | | |
|---|---|---|
| 1,4-Bis(4-phenoxy-3-methylbenzoyl)benzene* | 2 g | $4.0114 \times 10^{-3}$ M |
| 4,4'-Diphenyldicarboxylic acid dichloride | 1.1196 g | $4.0113 \times 10^{-3}$ M |
| Benzoic acid | 0.9789 g | $8.024 \times 10^{-3}$ M |
| Aluminium Trichloride | 3.85 g | 0.0289 M |
| Dichloromethane | 20 mls | |

(*Monomer PI)

The resulting polymer had the repeat unit

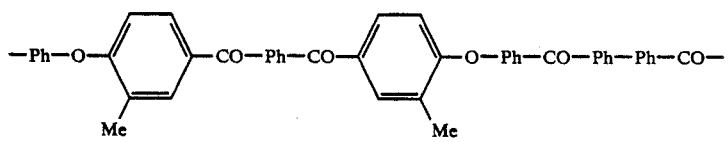

EXAMPLE 3

Following the procedure outline in Example 1 a copolymer of I.V. 1.10 dl/g having Tg 181° C. and Tm 333° C. was prepared using the following reagents.

| | | |
|---|---|---|
| 4,4'-Diphenoxybenzophenone | 1.6891 g | $4.6097 \times 10^{-3}$ M |
| 4,4''-Bis[4-(2-methylphenyloxy)benzoyl]terphenyl* | 1.5000 g | $2.305 \times 10^{-3}$ M |
| Terephthaloyl chloride | 1.4038 g | $6.9146 \times 10^{-3}$ M |
| Dimethyl sulphone | 1.94 g | 0.0206 M |
| Aluminium Trichloride | 6.88 g | 0.0516 M |

| | |
|---|---|
| Dichloromethane | 35 mls |

An identical polymer of I.V. 2.09 dl/g was prepared where the butanol was replaced with dimethyl
The polymer had the repeat units —Ph—O—Ph—CO—Ph—O—Ph—CO—Ph—CO— and

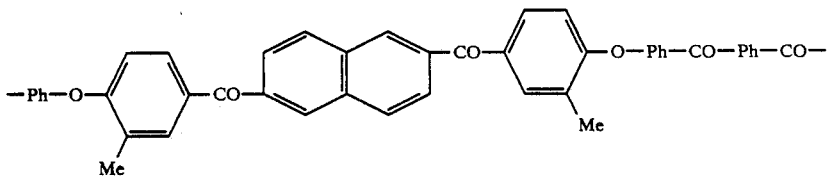

(*Monomer PIII)

The structure of this polymer was confirmed by ¹H and ¹³C NMR spectroscopy a containing the copolymer repeat units (Ph=p-phenylene)

$+$Ph—O—Ph—CO—Ph—O—Ph—CO—Ph—CO$+$, and

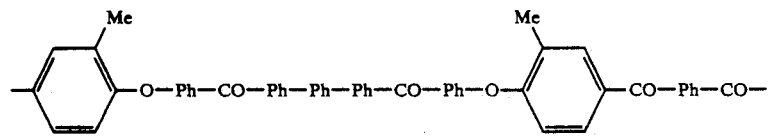

in a ratio of (a):(b) of approximately 2:1.

EXAMPLE 4

Following the procedure outlined in Example 1 a homo-polymer of I.V. 0.91 dl/g having Tg 197° C. and Tm 360° C. was prepared using the following reagents.

| | | |
|---|---|---|
| 4,4''-Bis[4-2-methylphenyloxy)-benzoyl]terphenyl* | 2 g | 3.0733 × 10⁻³ M |
| Terephthaloyl chloride | 0.6239 g | 3.0733 × 10⁻³ M |
| Dimethyl sulphone | 1.155 g | 0.01229 M |
| Aluminium Trichloride | 15.73 g | 0.11798 M |
| Dichloromethane | 20 mls | |

(*Monomer PIII)

The polymer repeat unit was

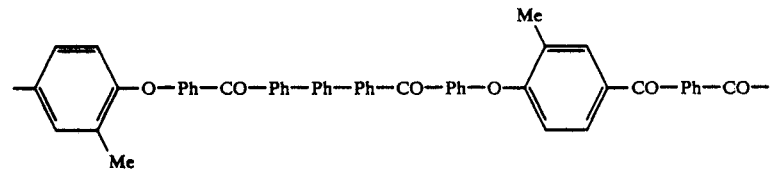

EXAMPLE 5

Following the procedure outlined in Example 1 a polymer of I.V. 2.50 dl/g having Tg 176° C. and Tm 340° C. was prepared using the following reagents.

| | | |
|---|---|---|
| Diphenoxybenzophenone | 5.6313 g | 0.01537 M |
| Terephthaloyl chloride | 3.9004 g | 0.0192 M |
| 2,6-Bis(4-phenoxy-3-methylbenzoyl)naphthalene* | 2.1078 g | 3.8421 × 10⁻³ M |
| Butanol | 4.44 g | 0.06 M |
| Aluminium Trichloride | 19.74 g | 0.148 M |
| Dichloromethane | 40 mls | |

(*Monomer PXVI)

EXAMPLE 6

Following the procedure outlined in Example 1 a polymer of I.V. 0.92 dl/g having Tg 195° C. and Tm 370° C. was prepared using the following reagents.

(a)

(b)

| | | |
|---|---|---|
| 1,8-Bis(4-phenoxyphenyloxy)-anthraquinone* | 3 g | 5.2049 × 10⁻³ M |
| Terephthaloyl chloride | 1.0567 g | 5.2049 × 10⁻³ M |
| Dimethyl sulphone | 1.467 g | 0.0156 M |
| Aluminium Trichloride | 5.9 g | 0.044 M |
| Dichloromethane | 30 mls | |

(*Monomer PIV)

The structure of the isolated polymer was confirmed as being

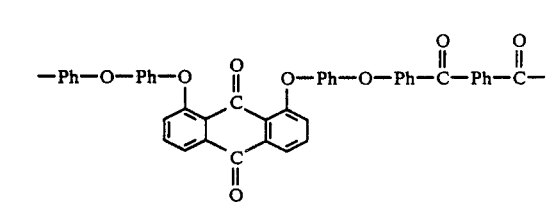

The novel starting monomer PXIX, viz 4,4'-bis(4-phenylphenyloxy)benzophenone, and its m- linked, isomeric forms, and polymers produced therefrom, preferably by Friedel-Crafts polymerisation with an appropriate acid halide, preferably an aroyl halide, are further aspects of the present invention.

An example of the preparation of monomer (PXIX) follows.

EXAMPLE 7

Preparation of 4,4'-bis(4-phenylphenyloxy)benzophenone

To a mixture of 300 mls of dimethylacetamide and 75 mls of toluene were added 46 g (0.27 M) of 4-phenylphenol and 15.2 g (0.27 M) of potassium hydroxide. The whole was stirred and brought to reflux and water of reaction removed using a Dean-Stark head. Once all the water had been removed 29.53 g (0.118 M) of 4,4'-dichlorobenzophenone was added. The temperature of the reactants was increased to 155° C., by progressively removing toluene, and maintained for 5 hours. After allowing to cool the reaction mixture was poured into cold methanol and the off white precipitate was filtered off and washed with 2× 500 mls of methanol. After drying the nearly white product was crystallised from a hot 1:1 mixture of chlorobenzene and 1,2-dichlorobenzene.

The identity of the product was confirmed by mass spectroscopy and $^{13}$C NMR spectroscopy.

Yield 55 g - 96%, Purity as measured by D.S.C. was 99.89%

A new monomer of formula

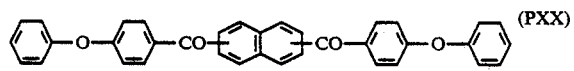 (PXX)

preferably the 2,6-naphthyl form thereof, or the 2,8-naphthyl form thereof, may be useful in preparing polyaryletherketones generally, as well as those falling within the scope of the present invention. An example of the preparation of this monomer follows.

EXAMPLE 10 - Monomer Preparation

To a 1 liter flask equipped with a stirrer and gas inlet/outlet was added 250 mls of dichloromethane which was then cooled to −25° C. To the cold solvent was added 66.67 g (0.5 M) of aluminium chloride. To this cold slurry, at −25° C., was slowly added 200 g (1.175 M) of diphenyl ether, keeping the temperature in the vessel below −10° C. After cooling the flask contents back to −25° C., 50 g (0.1970 M) of 2,6-naphthalene dicarboxylic acid chloride was added to the reaction mixture and residual acid chloride rinsed into the flask with 50 mls of fresh dichloromethane. The reaction mixture was then allowed to warm to +22° C. and maintained for 6 hours. The orange/yellow suspension was decomplexed by pouring the whole onto 1.5 kgs of ice. After filtering the white solid was washed with deionised water and dried overnight at 120° C. The crude product was crystallised from toluene (2.2 liters) to give 90 g of a pure white crystalline product (88%).

The purity of the resulting 2,6-Bis(4-phenoxybenzoyl)naphthalene as determined by D.S.C. was 99.67 M % m.p. 214° C.

We claim:

1. A crystalline thermoplastic (arylene ether ketone) polymer having repeat units of the general formula

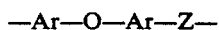 (I)

wherein (a) each —O— is ether oxygen and each Z independently is imide, amide, ester, azo, quinoxaline, benzimidazole, benzoxazole, benzothiazole, sulphone, sulphide, or methylene and at least 25% of the Z groups are —CO— groups, (b) each Ar moiety independently is selected from substituted and unsubstituted phenylene and substituted and unsubstituted polynuclear aromatic moieties having no two adjacent methylene carbon atoms forming part of the polymer backbone chains, (c) at least some of the non-terminal Ar moieties comprise aryl-aryl moieties in which two or more aryl rings forming part of the polymer backbone chain and fused and/or directly single bonded together, and/or twice bonded together to form a cyclic linking structure with more than 4 atoms in the cyclic linking structure, (d) at least some of the Ar moieties independently are mono-substituted with substantially inert pendent substituent groups other than iodo, the substituent comprising not more than two aryl rings, if any, and/or at least some of the fused ring aryl-aryl moieties project form, or form a kink in, the polymer backbone chain by virtue of each such aryl-aryl moiety being asymmetrical about a straight line passing through those two of its atoms whereby it is bonded to the remainder of the backbone chain, with the proviso that in homopolymers where the Ar moieties are unsubstituted, any naphthyl moiety constituting the aryl-aryl moieties is an 1,4-, 1,8- or 2,8- naphthyl moiety and any anthracenyl moiety constituting the aryl-aryl moieties is a 1,4- or 1,5 anthracenyl moiety, and in homopolymers where any Ar moieties are substituted as aforesaid, any naphthyl moiety constituting the aryl-aryl moieties is a 2,6- or 2,7- naphthyl moiety, and (e) the size, number, and position of the substituent groups and/or asymmetry of the asymmetrical aryl-aryl moieties are limited to retain at least 2% crystallinity in the bulk polymer after annealing between its glass transition temperature and its crystalline melting temperature.

2. A polymer according to claim 1, wherein at least of the aryl-aryl moieties have structures corresponding to anthraquinones, xanthones or benzofurans.

3. A polymer according to claim 1, wherein at least some of the aryl-aryl moieties have structures corresponding to biphenyl or terphenyl moieties.

4. A polymer according to claim 1, wherein at least some of the aryl-aryl moieties have structures corresponding to naphthalene or other fused-ring hydrocarbons.

5. A polymer according to claim 1, wherein at least some of the aryl-aryl moieties have structures other than those corresponding to biphenyl or naphthalene moieties.

6. A polymer according to claim 1, wherein at least some of the Ar moieties comprising the aryl-aryl moieties include linking moieties which link the aryl-aryl moieties with the remainder of the polymer backbone chain.

7. A polymer according to claim 1, wherein at least some of the aryl-aryl moieties are directly bonded to the —O— and —Z— groups in the polymer backbone chain.

8. A polymer according to claim 1, wherein the aryl-aryl moieties are thermally stable up to at least 300° C.

9. A polymer according to claim 1, wherein the said substituent groups are selected from $C_1$-$C_6$ alkyl and cycloalkyl groups; haloalkyl groups, deactivated aryl groups, fluoro, chloro and nitro, groups.

10. A polymer according to claim 1, wherein substantially all the substituted Ar moieties are monosubstituted.

11. A polymer according to claim 1 or 10, wherein no two substituted aryl rings are directly attached to the same ether oxygen.

12. A polymer according to claim 1 which retains at least 10% crystallinity, preferably 20 to 35% crystallinity, after the annealing.

13. A polymer according to claim 1, wherein at least

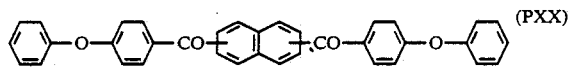

preferably the 2,6-naphthyl form thereof, or the 2,8-naphthyl form thereof.

19. A polymer produced from a monomer compound according to claim 17 or 18.

20. A crystalline thermoplastic (arylene ether ketone) polymer according to claim 1 comprising the repeat units:

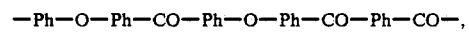

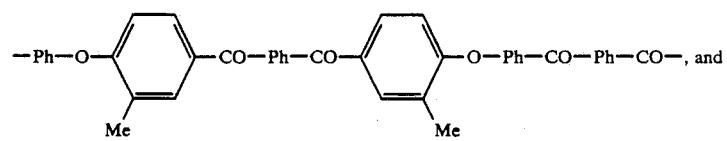

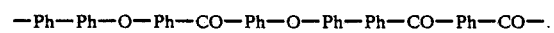

70%, preferably at least 80% of the Z groups are —CO— groups.

14. A polymer according to claim 13, wherein substantially all of the Z groups are —CO— groups.

15. A polymer according to claim 1, wherein some of the Z groups are selected from imide, amide, ester, azo, quinoxaline, benzimidazole, benzoxazole, benzothiazole, sulphone, sulphide and methylene groups.

16. A polymer according to claim 1 having the repeat unit or units shown in any one of the foregoing Examples 1 to 6.

17. A compound of formula

21. A crystalline thermoplastic (arylene ether ketone) polymer according to claim 1 comprising the repeat unit:

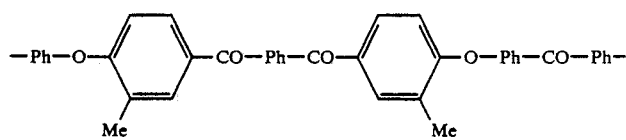

22. A crystalline thermoplastic (arylene ether ketone) polymer according to claim I comprising the repeat units:

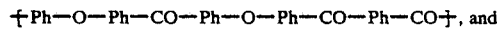

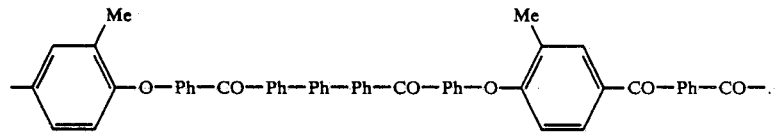

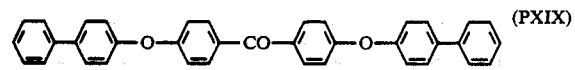

23. A crystalline thermoplastic (arylene ether ketone) polymer according to claim 1 comprising the repeat unit:

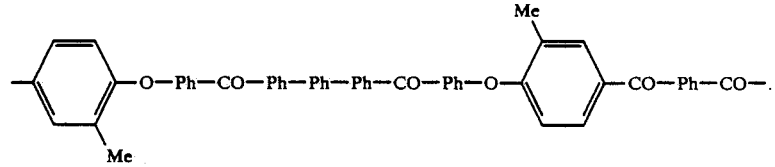

18. A compound of formula

24. A crystalline thermoplastic (arylene ether ketone) polymer according to claim 1 comprising the repeat units:

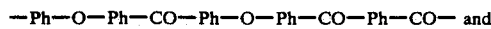

-continued
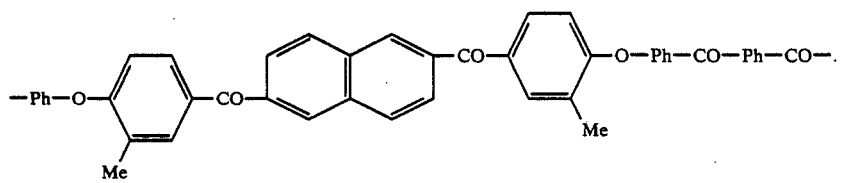
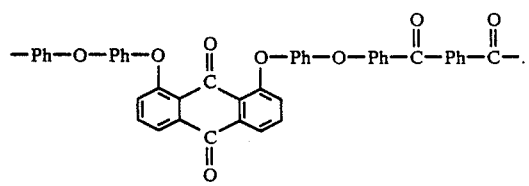
25. A crystalline thermoplastic (arylene ether ketone) polymer according to claim 1 comprising the repeat unit:
* * * * *